United States Patent
Hirose et al.

(10) Patent No.: US 8,722,245 B2
(45) Date of Patent: May 13, 2014

(54) ANODE FOR SECONDARY BATTERY, SECONDARY BATTERY, AND METHOD OF MANUFACTURING ANODE FOR SECONDARY BATTERY

(75) Inventors: Takakazu Hirose, Fukushima (JP); Isamu Konishiike, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 11/420,276

(22) Filed: May 25, 2006

(65) Prior Publication Data
US 2006/0275662 A1 Dec. 7, 2006

(30) Foreign Application Priority Data

Jun. 1, 2005 (JP) ................................ P2005-161258

(51) Int. Cl.
*H01M 4/38* (2006.01)
*H01M 4/58* (2010.01)
*H01M 4/04* (2006.01)

(52) U.S. Cl.
USPC .................................. 429/218.1; 429/231.95

(58) Field of Classification Search
USPC .......................................... 429/218.1, 231.95
See application file for complete search history.

(56) References Cited

U.S. PATENT DOCUMENTS

| 6,887,623 | B2 * | 5/2005 | Fujimoto et al. ............... 429/232 |
| 2003/0099884 | A1 * | 5/2003 | Chiang et al. .................. 429/233 |
| 2004/0048157 | A1 * | 3/2004 | Neudecker et al. ......... 429/231.2 |
| 2004/0224219 | A1 * | 11/2004 | Miyaki et al. .................... 429/94 |
| 2005/0118504 | A1 * | 6/2005 | Honda et al. ................ 429/218.1 |
| 2005/0153208 | A1 * | 7/2005 | Konishiike et al. ............ 429/245 |
| 2007/0031733 | A1 * | 2/2007 | Kogetsu et al. ................ 429/245 |
| 2007/0166613 | A1 * | 7/2007 | Kogetsu et al. ............. 429/218.1 |

FOREIGN PATENT DOCUMENTS

| JP | 08-050922 | 2/1996 |
| JP | 11-135111 | 5/1999 |
| JP | 2948205 | 12/1999 |
| JP | 2001-143235 | 5/2001 |
| JP | 2004-292931 | 10/2004 |
| JP | 2005-196970 | 7/2005 |
| JP | 2005196970 A * | 7/2005 |
| JP | 2006-155958 | 6/2006 |
| WO | 01/29912 | 4/2001 |

OTHER PUBLICATIONS

Japanese Patent Office Action corresponding to Japanese Serial No. 161258 dated Apr. 19, 2011.
Korean Office Action dated Sep. 5, 2013, issued in connection with counterpart Korean Patent Application No. 10-2006-48647.

* cited by examiner

*Primary Examiner* — Gregg Cantelmo
(74) *Attorney, Agent, or Firm* — Dentons US LLP

(57) ABSTRACT

An anode for secondary battery capable of improving cycle characteristics, a secondary battery using the anode, and a method of manufacturing an anode for secondary battery are provided. An anode active material layer is formed by vapor phase deposition method, and contains Si as an element. In the anode active material layer, there are a plurality of primary particles grown in the thickness direction. The primary particles aggregate and form a plurality of secondary particles. At least some of the primary particles have shape curved in the identical direction to an anode current collector on the cross section in the thickness direction. Thereby, stress due to expansion and shrinkage due to charge and discharge can be relaxed.

5 Claims, 9 Drawing Sheets

ANODE FOR SECONDARY BATTERY, SECONDARY BATTERY, AND METHOD OF MANUFACTURING ANODE FOR SECONDARY BATTERY

CROSS REFERENCES TO RELATED APPLICATIONS

The present invention contains subject matter related to Japanese Patent Application JP 2005-161258 filed in the Japanese Patent Office on Jun. 1, 2005, the entire contents of which being incorporated herein by reference.

BACKGROUND OF THE INVENTION

1. Field of the Invention

The present invention relates to an anode containing silicon (Si) as an element, a battery using it, and a method of manufacturing an anode.

2. Description of the Related Art

In recent years, as mobile devices have been sophisticated and multi-functionalized, a higher capacity of secondary batteries as a power source for these mobile devices has been demanded. As a secondary battery to meet such a demand, there is a lithium ion secondary battery. However, since the lithium ion secondary battery currently in practical use utilizes graphite for the anode, the battery capacity is in a saturated state and attaining a significantly high capacity thereof is difficult. Therefore, it has been considered to use silicon or the like for the anode. In recent years, forming the anode active material layer on the anode current collector by vapor-phase deposition method or the like has been reported (for example, refer to Japanese Unexamined Patent Application Publication No. H08-50922, Japanese Patent Publication No. 2948205, and Japanese Unexamined Patent Application Publication No. H11-135115). Since silicon or the like is largely expanded and shrunk due to charge and discharge, lowering of cycle characteristics due to pulverization has been a problem. However, when the vapor-phase deposition method is used, miniaturization can be inhibited, and the anode current collector and the anode active material layer can be integrated. Therefore, electron conductivity in the anode becomes significantly favorable, and realizing high performance in view of the capacity and the cycle life has been improved.

SUMMARY OF THE INVENTION

However, there is a disadvantage that even in the anode in which the anode current collector and the anode active material layer are integrated, when charge and discharge are repeated, stress is generated between the anode current collector and the anode active material layer due to intense expansion and shrinkage of the anode active material layer, leading to drop of the anode active material layer and lowering of cycle characteristics.

In view of the foregoing, in the present invention, it is desirable to provide an anode for secondary battery capable of inhibiting shape decay of the anode active material layer and improving battery characteristics such as cycle characteristics, a secondary battery using the anode, and a method of manufacturing an anode for secondary battery.

According to an embodiment of the present invention, there is provided an anode for secondary battery in which an anode active material layer containing silicon as an element is provided on an anode current collector, in which the anode active material layer has a plurality of primary particles grown to the anode current collector, and at least some of the primary particles have shape curved to the anode current collector.

According to an embodiment of the present invention, there is provided a secondary battery including a cathode, an anode, and an electrolyte, in which in the anode, an anode active material layer containing silicon as an element is provided on an anode current collector, the anode active material layer has a plurality of primary particles grown to the anode current collector, and at least some of the primary particles have shape curved to the anode current collector.

According to an embodiment of the present invention, there is provided a method of manufacturing an anode for secondary battery for forming an anode active material layer containing silicon as an element on an anode current collector, in which the anode active material layer is grown by vapor-phase deposition method while the incident angle of the raw material of the anode active material layer is changed to the anode current collector.

According to the anode for secondary battery of the embodiment of the present invention, the curve-shaped primary particles are included. Therefore, stress due to expansion and shrinkage due to charge and discharge can be relaxed, shape destruction of the anode active material layer and peeling of the anode active material layer from the anode current collector can be inhibited. Therefore, according to the secondary battery of the embodiment of the present invention using this anode, battery characteristics such as cycle characteristics can be improved.

Further, according to the method of manufacturing an anode for secondary battery of the embodiment of the present invention, the anode active material layer is grown by vapor-phase deposition method while the incident angle of the raw material of the anode active material layer is changed to the anode current collector. Therefore, the anode for secondary battery of the embodiment of the present invention can be easily manufactured.

Other and further objects, features and advantages of the invention will appear more fully from the following description.

DETAILED DESCRIPTION OF THE PREFERRED EMBODIMENTS

Embodiments of the present invention will be hereinafter described in detail with reference to the drawings.

First Embodiment

Figure 1:
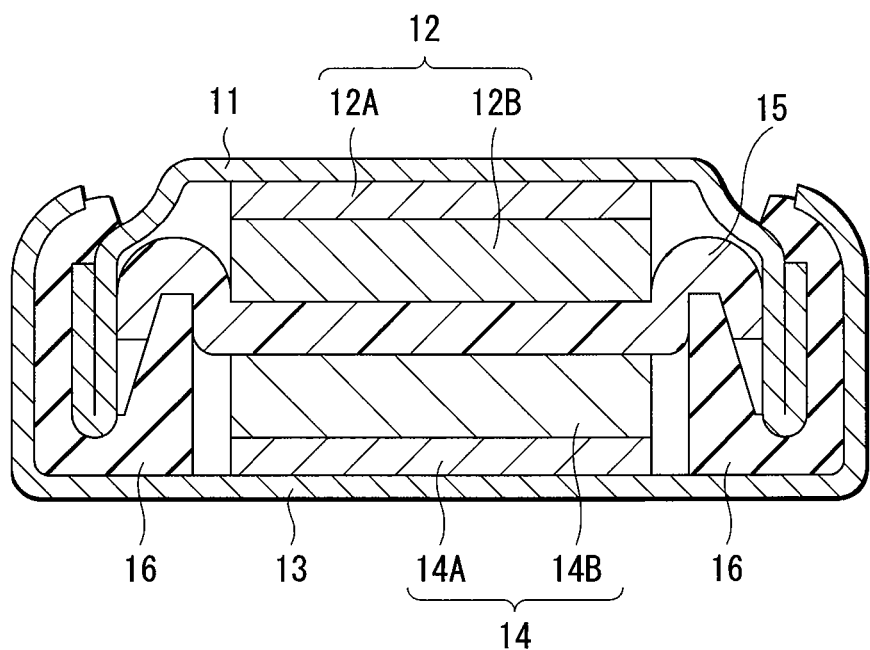
FIG. 1 is a cross section showing a structure of a secondary battery according to a first embodiment of the present invention.

FIG. 1 shows a structure of a secondary battery according to a first embodiment of the present invention. The secondary battery is a so-called coin type secondary battery in which an anode 12 contained in a package cup 11 and a cathode 14 contained in a package can 13 are layered with a separator 15 in between Peripheral edges of the package cup 11 and the package can 13 are hermetically sealed by being caulked with an insulating gasket 16. The package cup 11 and the package can 13 are respectively made of a metal such as stainless and aluminum (Al).

The anode 12 has, for example, an anode current collector 12A and an anode active material layer 12B provided on the anode current collector 12A.

The anode current collector 12A is preferably made of a metal material containing at least one metal element not forming an intermetallic compound with lithium (Li). When the intermetallic compound is formed with lithium, the anode is expanded and shrunk due to charge and discharge, structural destruction occurs, and current collectivity characteristics are lowered. In addition, ability to support the anode active material layer 12B is lowered. In this specification, the metal materials include an alloy including two or more metal elements or an alloy including one or more metal elements and one or more metalloid elements, in addition to simple substances of metal elements. As a metal element not forming an intermetallic compound with lithium, for example, copper (Cu), nickel (Ni), titanium (Ti), iron (Fe), and chromium (Cr) can be cited.

The anode current collector 12A preferably contains a metal element being alloyed with the anode active material layer 12B. Thereby, contact characteristics between the anode active material layer 12B and the anode current collector 12A can be improved. As a metal element not forming an intermetallic compound with lithium and being alloyed with the anode active material layer 12B, in the case that the anode active material layer 12B contains silicon as an element as described later, for example, copper, nickel, or iron can be cited. These elements are preferable in view of strength and electrical conductivity as well.

The anode current collector 12A may be a single layer or a plurality of layers. In the latter case, the layer contacting with the anode active material layer 12B may be made of a metal material being alloyed with silicon, and other layers may be made of other metal material. Further, the anode current collector 12A is preferably made of a metal material made of at least one of metal elements not forming an intermetallic compound with lithium except for the interface with the anode active material layer 12B.

The face of the anode current collector 12A on which the anode active material layer 12B is provided is preferably roughened. Thereby, contact characteristics with the anode active material layer 12B can be improved.

The anode active material layer 12B contains silicon as an element. Silicon has a high ability to insert and extract lithium, and provides a high energy density. Silicon may be contained in the form of the simple substance, an alloy, a compound, or a mixture of two or more thereof.

The anode active material layer 12B is formed, for example, by vapor-phase deposition method. The anode active material layer 12B has a plurality of primary particles formed by growing in the thickness direction. The plurality of primary particles aggregate and form a plurality of secondary particles.

Figure 2:
FIG. 2 is an SEM photograph showing a particle structure of an anode active material layer according to the secondary battery shown in FIG. 1.
Figure 3:
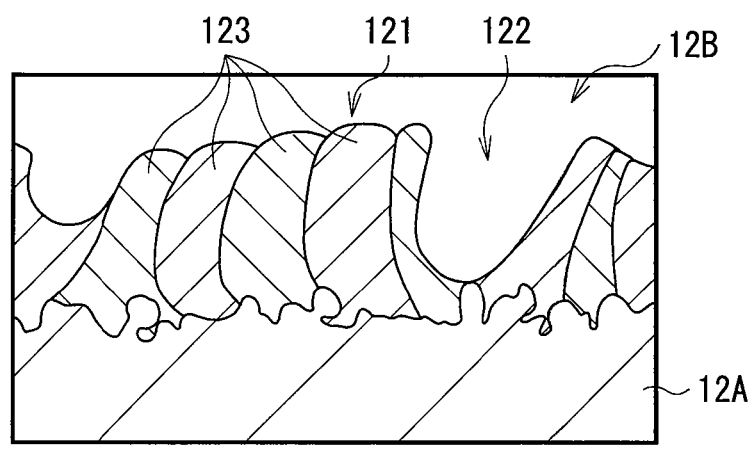
FIG. 3 is a model view showing a particle structure of the anode active material layer according to the secondary battery shown in FIG. 1.

FIG. 2 is a Scanning Electron Microscope (SEM) photograph showing a particle structure on the cross section in the thickness direction of the anode active material layer 12B. FIG. 3 shows the particle structure as a model. As shown in FIGS. 2 and 3, each secondary particle 121 is separated by a groove 122. The groove 122 is formed, for example, by charge and discharge, and approximately reaches the anode current collector 12A. Each primary particle 123 is not simply adjacent to each other, but at least some of each primary particle 123 is jointed to each other to form the secondary particle 121.

Further, at least some of the primary particles 123 have a curved shape with respect to the anode current collector 12A, and the primary particles 123 are curved in the identical direction on the cross section in the thickness direction, for example. Thereby, in the secondary battery, stress due to expansion and shrinkage due to charge and discharge can be relaxed, and expansion in the thickness direction can be reduced. All the primary particles 123 may be curved. However, as shown in FIGS. 2 and 3, on the interface of each secondary particle 121 separated by the groove 122, such a structure may be destructed in some cases. Therefore, it is not always necessary that all the primary particles 123 are curved in similar fashion.

Such a particle structure may be observed by SEM as shown in FIG. 2, or may be observed by Scanning Ion Microscope (SIM). Further, the cross section is preferably cut by FIB (Focused Ion Beam), a microtome or the like.

The anode active material layer 12B is preferably alloyed with the anode current collector 12A at least at part of the interface with the anode current collector 12A. Specifically, on the interface, the element of the anode current collector 12A is preferably diffused in the anode active material layer 12B, or the element of the anode active material layer 12B is preferably diffused in the anode current collector 12A, or both elements thereof are preferably diffused in each other. Thereby, even when the anode active material layer 12B is expanded and shrunk due to charge and discharge, the anode active material layer 12B is prevented from being dropped from the anode current collector 12A.

The cathode 14 has, for example, a cathode current collector 14A and a cathode active material layer 14B provided on the cathode current collector 14A. Arrangement is made so that the cathode active material layer 14B side is opposed to the anode active material layer 12B. The cathode current collector 14A is made of, for example, aluminum, nickel, stainless or the like.

The cathode active material layer 14B contains, as a cathode active material, for example, one or more cathode materials capable of inserting and extracting lithium. The cathode active material layer 14B may contain an electrical conductor such as a carbon material and a binder such as polyvinylidene fluoride according to needs. As a cathode material capable of inserting and extracting lithium, for example, the lithium-containing metal complex oxide expressed by a general formula, $Li_xMIO_2$ is preferable, since the lithium-containing metal complex oxide can generate a high voltage and has a high density, leading to a higher capacity of the secondary battery. MI represents one or more transition metal elements, and for example, preferably contains at least one of cobalt and nickel. x varies according to charge and discharge states of the battery, and is generally in the range of $0.05 \leq x \leq 1.10$. As a specific example of such a lithium-containing metal complex oxide, $LiCoO_2$, $LiNiO_2$ or the like can be cited.

The separator 15 separates the anode 12 from the cathode 14, prevents current short circuit due to contact of the both electrodes, and lets through lithium ions. The separator 15 is made of, for example, polyethylene or polypropylene.

An electrolytic solution, which is a liquid electrolyte, is impregnated in the separator 15. The electrolytic solution contains, for example, a solvent and an electrolyte salt dissolved in the solvent. The electrolytic solution may contain an additive according to needs. As a solvent, for example, a nonaqueous solvent such as ethylene carbonate, propylene carbonate, dimethyl carbonate, diethyl carbonate, and ethyl methyl carbonate can be cited. One of the solvents may be used singly, or two or more thereof may be used by mixing.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The secondary battery can be fabricated as follows, for example.

First, the anode active material layer 12B containing silicon as an element is formed on the anode current collector 12A by, for example, vapor phase deposition method. As vapor phase deposition method, for example, physical deposition method or chemical deposition method can be cited. Specifically, any of vacuum vapor deposition method, sputtering method, ion plating method, laser ablation method, CVD (Chemical Vapor Deposition) method, and thermal spraying method may be used. Then, for example, the incident angle of the raw material is continuously changed to the anode current collector 12A.

Figure 4:
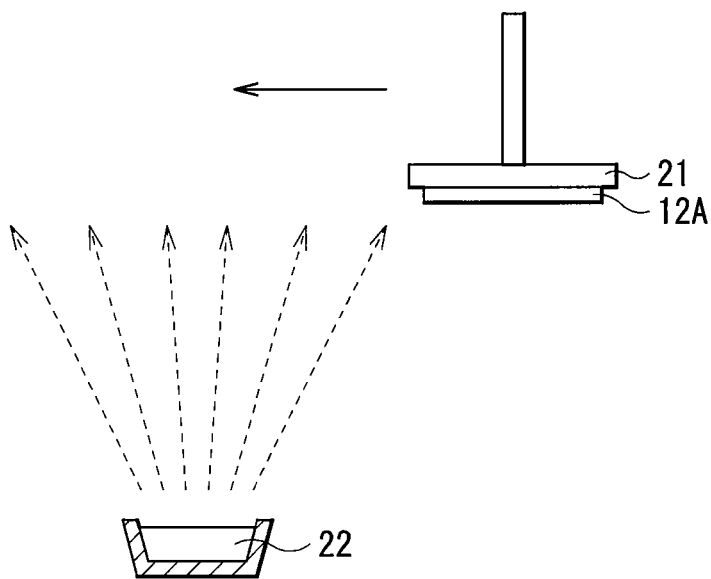
FIG. 4 shows an example of a configuration of manufacturing equipment used in forming the anode active material layer according to the secondary battery shown in FIG. 1.
Figure 5:
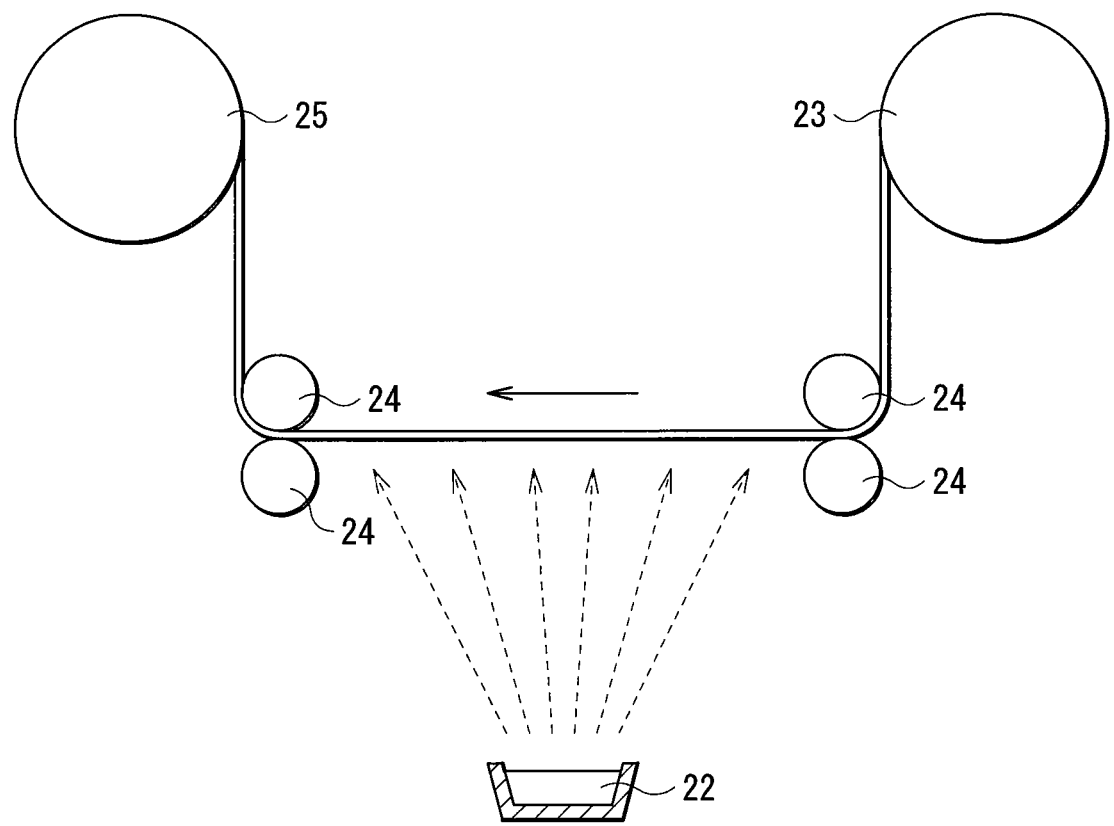
FIG. 5 shows another example of a configuration of manufacturing equipment used in forming the anode active material layer according to the secondary battery shown in FIG. 1.
Figure 6:
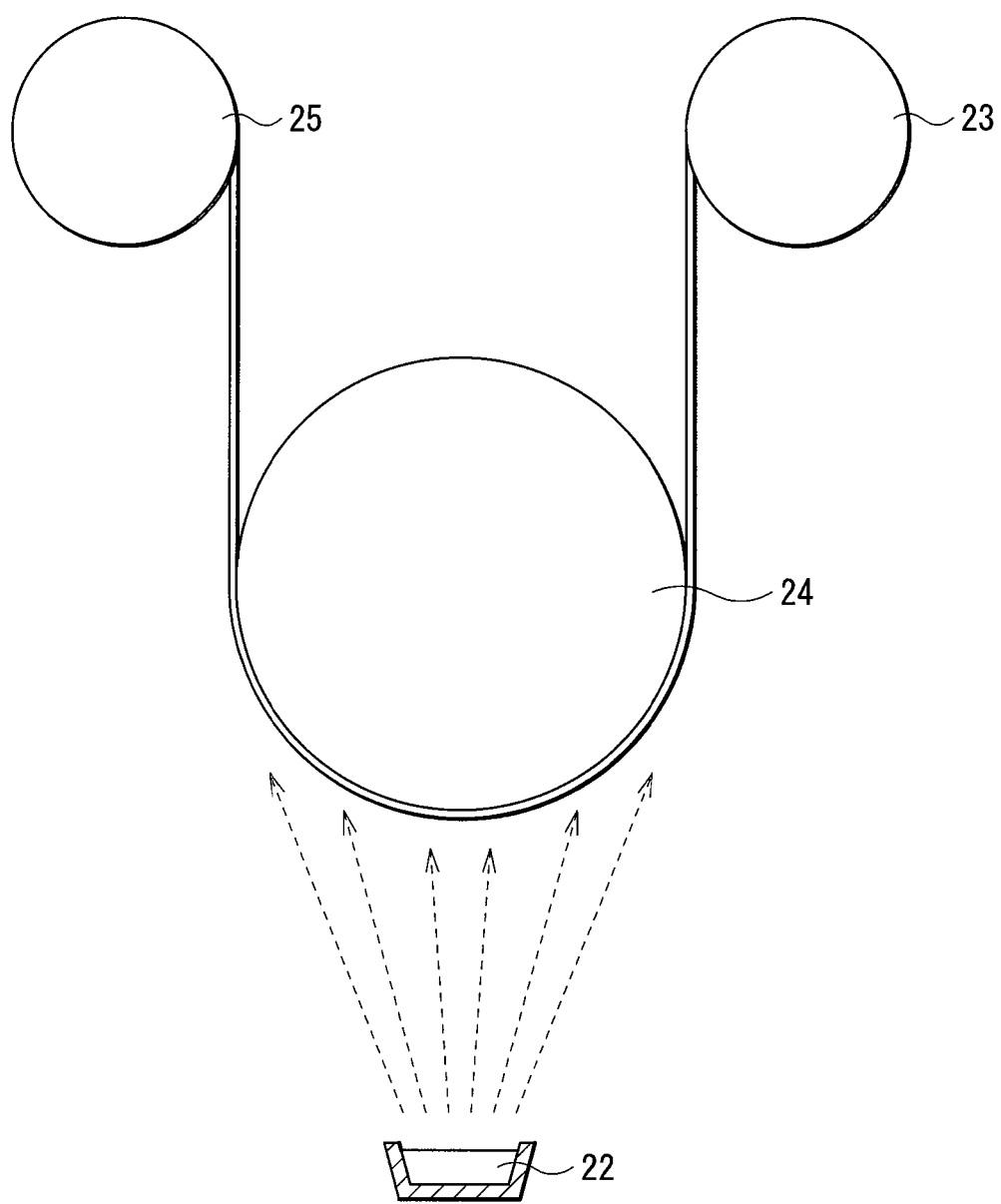
FIG. 6 shows still another example of a configuration of manufacturing equipment used in forming the anode active material layer according to the secondary battery shown in FIG. 1.

FIGS. 4 to 6 show an example of a structure of manufacturing equipment of forming the anode active material layer 12B by vapor deposition method. For example, as shown in FIG. 4, it is possible that the anode current collector 12A is attached to a fixed base 21, and the fixed base 21 is moved relatively to a raw material 22. Otherwise, as shown in FIGS. 5 and 6, it is possible that while the strip-shaped anode current collector 12A is moved from a supply roll 23 to a winding roll 25 through a support roller 24, the anode current collector 12A is moved relatively to the raw material 22. Further, in the manufacturing equipment shown in FIGS. 5 and 6, the anode current collector 12A may be directly moved from the supply roll 23 to the winding roll 25 without through the support roller 24.

In particular, as shown in FIGS. 5 and 6, it is preferable that while the anode current collector 12A is moved through a rotational support such as the supply roll 23, the support roller 24, and the winging roll 25, the incident angle of the raw material is changed. Thereby, the anode active material layer 12B can be continuously formed. Further, as shown in FIG. 6, it is preferable that the anode active material layer 12B is formed while the cylindrical support roller 24 is arranged in the position opposed to the raw material 22 and the anode current collector 12A is moved curvedly. Thereby, the primary particle 123 is more curved and stress can be dispersed, the distance at which the anode active material layer 12B can be formed can be lengthened, and productivity can be more improved. In FIGS. 4 to 6, the vapor deposition method has been specifically described. However, in other methods, the incident angle of the raw material 22 can be similarly changed.

Thereby, the primary particle of the anode active material layer 12B is grown curved to the anode current collector 12A. Next, heat treatment is provided under the vacuum atmosphere or the non-oxidizing atmosphere according to needs.

Subsequently, the cathode active material layer 14B is formed on the cathode current collector 14A. For example, a cathode active material, and if necessary an electrical conductor and a binder are mixed, the cathode current collector 14A is coated with the mixture, the resultant is compression-molded. After that, the anode 12, the separator 15, and the cathode 14 are layered, the lamination is contained between the package cup 11 and the package can 13, an electrolytic solution is injected, and the resultant is caulked, and thereby a battery is assembled. After the battery is assembled, for example, by performing charge and discharge, the groove 122 is formed in the anode active material layer 12B, and the anode active material layer 12B is divided into the secondary particle 121.

In the secondary battery, when charged, for example, lithium ions are extracted from the cathode 14 and inserted in the anode 12 through the electrolytic solution. When discharged, for example, lithium ions are extracted from the anode 12 and inserted in the cathode 14 through the electrolytic solution. As charge and discharge are performed, the anode active material layer 12B is largely expanded and shrunk. However, since the primary particle 123 has a shape curved to the anode current collector 12A, stress is relaxed, and shape destruction and peeling of the anode active material layer 12B from the anode current collector 12A are inhibited.

As above, according to this embodiment, at least some of the primary particles 123 of the anode active material layer 12B have shape curved to the anode current collector 12A. Therefore, stress due to expansion and shrinkage due to charge and discharge can be relaxed, and shape destruction of the anode active material layer 12B and peeling of the anode active material layer 12B from the anode current collector 12A can be inhibited. Therefore, battery characteristics such as cycle characteristics can be improved.

Further, when the incident angle of the raw material to the anode current collector 12A is changed, the anode 12 of this embodiment can be easily obtained. In particular, when the anode current collector 12A is moved through the rotational support, the anode active material layer 12B can be continuously formed, and productivity can be improved. Further, when the incident angle of the raw material is changed by moving the anode current collector 12A curvedly, the primary particle 123 can be more curved to disperse stress, the distance at which the anode active material layer 12B can be formed can be lengthened, and productivity can be more improved.

Second Embodiment

Figure 7:
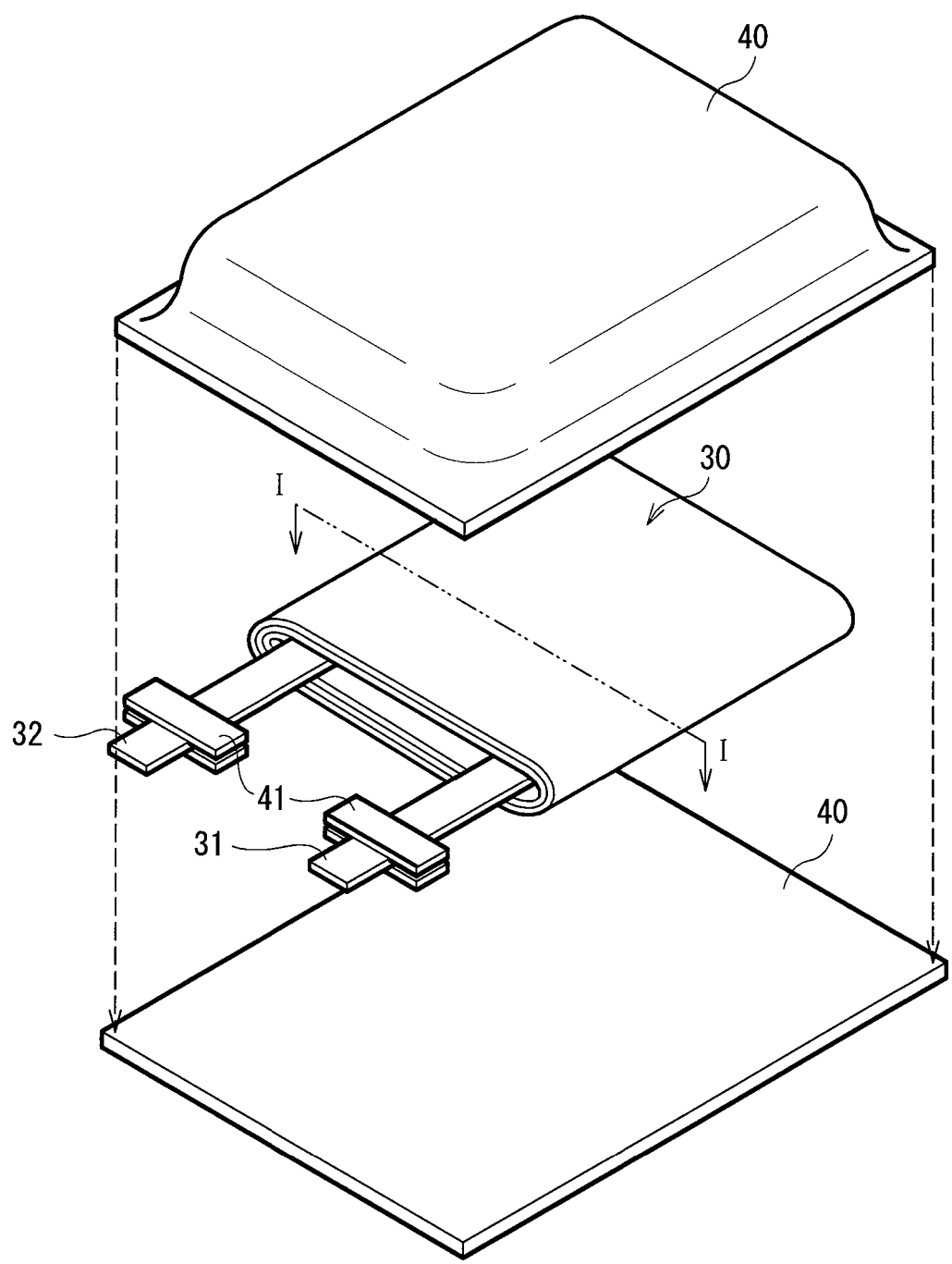
FIG. 7 is an exploded perspective view showing a structure of a secondary battery according to a second embodiment of the present invention.

FIG. 7 shows a structure of a secondary battery according to a second embodiment of the present invention. In the secondary battery, a spirally wound electrode body 30 on which leads 31 and 32 are attached is contained inside a film package member 40. Thereby, a small, light, and thin secondary battery can be obtained.

The leads 31 and 32 are respectively directed from inside to outside of the package member 40 in the same direction, for example. The leads 31 and 32 are respectively made of, for example, a metal material such as aluminum, copper, nickel, and stainless, and are in a state of thin plate or mesh, respectively.

The package member 40 is made of a rectangular aluminum laminated film in which, for example, a nylon film, an aluminum foil, and a polyethylene film are bonded together in this order. The package member 40 is, for example, arranged so that the polyethylene film side and the spirally wound electrode body 30 are opposed to each other, and the respective outer edges are contacted to each other by fusion bonding or an adhesive. Adhesive films 41 to protect from outside air intrusion are inserted between the package member 40 and the leads 31 and 32. The adhesive film 41 is made of a material having contact characteristics to the leads 31 and 32, for example, is made of a polyolefin resin such as polyethylene, polypropylene, modified polyethylene, and modified polypropylene.

The package member 40 may be made of a laminated film having other structure, a high molecular weight film such as polypropylene, or a metal film, instead of the foregoing aluminum laminated film.

Figure 8:
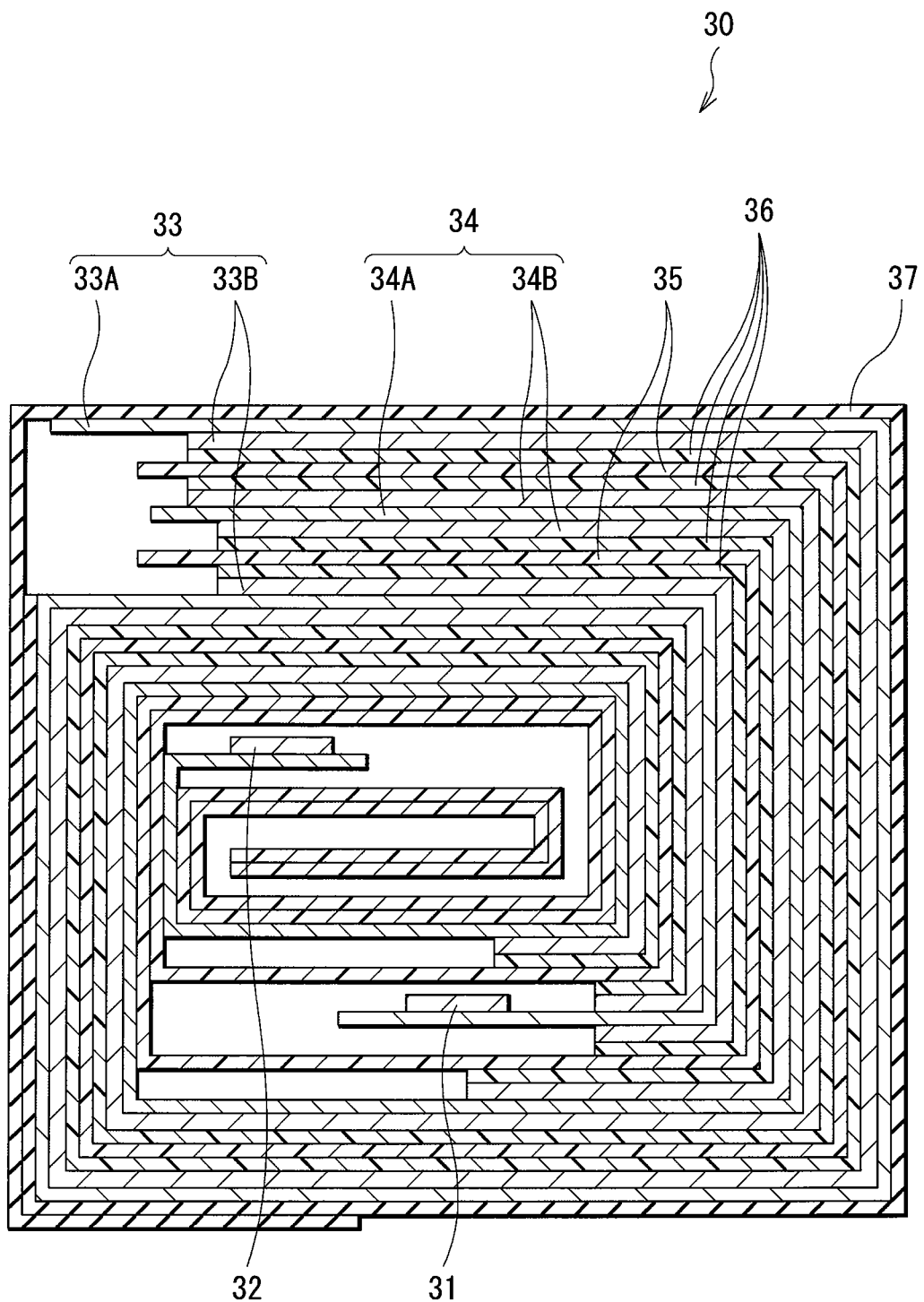
FIG. 8 is a cross section showing a structure taken along line I-I of the secondary battery shown in FIG. 7.

FIG. 8 shows a cross sectional structure taken along line I-I of the spirally wound electrode body 30 shown in FIG. 7. In the spirally wound electrode body 30, an anode 33 and a cathode 34 are layered with a separator 35 and an electrolyte layer 36 in between and wound. The outermost periphery thereof is protected by a protective tape 37.

The anode 33 has a structure in which an anode active material layer 33B is provided on the both faces of an anode current collector 33A. The cathode 34 also has a structure in which a cathode active material layer 34B is provided on the both faces of a cathode current collector 34A. Arrangement is made so that the cathode active material layer 34B is opposed to the anode active material layer 33B. The structures of the anode current collector 33A, the anode active material layer 33B, the cathode current collector 34A, the cathode active material layer 34B, and the separator 35 are similar to that of the anode current collector 12A, the anode active material layer 12B, the cathode current collector 14A, the cathode active material layer 14B, and the separator 15 respectively described above. The particle structure of the anode active material layer 33B is determined at the central portion of the portion of the spirally wound electrode body 30 where the curvature is not large.

The electrolyte layer 36 is made of a so-called gelatinous electrolyte in which an electrolytic solution is held in a holding body made of a high molecular weight compound. The gelatinous electrolyte is preferable, since a high ion conductivity can be thereby obtained, and liquid leakage of the battery can be thereby prevented. The structure of the electrolytic solution is similar to of the first embodiment. As a high molecular weight material, for example, polyvinylidene fluoride can be cited.

The secondary battery can be manufactured, for example, as follows.

First, after the anode 33 and the cathode 34 are formed in the same manner as in the first embodiment, the electrolyte layer 36 in which the electrolytic solution is held in the holding body is formed on the anode 33 and the cathode 34. Next, the leads 31 and 32 are attached to the anode current collector 33A and the cathode current collector 34A. Subsequently, the anode 33 and the cathode 34 formed with the electrolyte layer 36 are layered with the separator 35 in between and is wound. The protective tape 37 is adhered to the outermost periphery of the lamination to form the spirally wound electrode body 30. After that, for example, the spirally wound electrode body 30 is sandwiched between the package members 40, and outer edges of the package members 40 are contacted by thermal fusion bonding or the like to enclose the spirally wound electrode body 30. Then, the adhesive films 41 are inserted between the leads 31, 32 and the package member 40.

Further, the secondary battery may be fabricated as follows. First, in the same manner as in the first embodiment, the anode 33 and the cathode 34 are formed. After that, the leads 31 and 32 are attached thereto. Next, the anode 33 and the cathode 34 are layered with the separator 35 in between and wound. The protective tape 37 is adhered to the outermost periphery thereof, and a spirally wound body as a precursor of the spirally wound electrode body 30 is formed. Subsequently, the spirally wound body is sandwiched between the package members 40, and the outermost peripheries except for one side are thermally fusion-bonded to obtain a pouched state. After that, an electrolytic composition containing an electrolytic solution, a monomer as a raw material for the high molecular weight compound, a polymerization initiator, and if necessary other material such as a polymerization inhibitor is injected inside the package member 40. After that, the opening of the package member 40 is thermally fusion-bonded and hermetically sealed in the vacuum atmosphere. Next, the resultant is heated to polymerize the monomer to obtain a high molecular weight compound. Thereby, the gelatinous electrolyte layer 36 is formed.

After the battery is assembled as above, the groove 122 and the secondary particle 121 are formed in the anode active material layer 33B by, for example, performing charge and discharge in the same manner as in the first embodiment.

The secondary battery works similarly to in the first embodiment, and has effects similar to of the first embodiment. In particular, according to this embodiment, expansion in the thickness direction of the anode active material layer 33B can be inhibited. Therefore, even when charge and discharge are repeated, expansion of the battery can be inhibited.

EXAMPLES

Further, specific examples of the present invention will be hereinafter described in detail with reference to the drawings.

Examples 1 to 3

Secondary batteries having a structure shown in FIGS. 7 and 8 were fabricated. First, the anode active material layer 33B being about 9 μm thick made of silicon was formed on the anode current collector 33A made of a copper foil with roughened surface being 22 μm thick by electron beam vacuum vapor deposition method. Then, in Example 1, as shown in FIG. 4, the anode current collector 33A was attached to the fixed base 21, and the anode active material layer 33B was formed while the fixed base 21 was moved to the raw material. In Example 2, as shown in FIG. 5, the anode active material layer 33B was formed while the anode current collector 33A was moved from the supply roll 23 to the winding roll 25 through the support roller 24. In Example 3, as shown in FIG. 6, the anode active material layer 33B was formed while the anode current collector 33A was moved through the support roller 24 curvedly. Next, heat treatment was performed in the reduced pressure atmosphere.

Further, 92 parts by weight of lithium cobaltate ($LiCoO_2$) powders being 5 μm in an average particle diameter as a cathode active material, 3 parts by weight of carbon black as an electrical conductor, 5 parts by weight of polyvinylidene fluoride as a binder were mixed. The mixture was put in N-methyl-2-pyrrolidone as a disperse medium to obtain slurry. Next, the cathode current collector 34A made of an aluminum foil being 15 μm thick was coated with the slurry, which was dried and pressed to form the cathode active material layer 34B.

Subsequently, 37.5 wt % of ethylene carbonate, 37.5 wt % of propylene carbonate, 10 wt % of vinylene carbonate, and 15 wt % of $LiPF_6$ were mixed to prepare an electrolytic solution. The both faces of the anode 33 and the cathode 34 were respectively coated with a precursor solution obtained by mixing 30 wt % of the electrolytic solution, 10 wt % of polyvinylidene fluoride as a block copolymer with weight average molecular weight of 0.6 million, and 60 wt % of dimethyl carbonate, and dimethyl carbonate was volatilized to form the electrolyte layer 36.

After that, the leads 31 and 32 were attached, the anode 33 and the cathode 34 were layered with the separator 35 in between and wound, and the resultant was enclosed in the package member 40 made of an aluminum laminated film. Thereby, the secondary battery was assembled.

As Comparative examples 1 and 2 relative to Examples 1 to 3, secondary batteries were fabricated in the same manner as in Examples 1 to 3, except that in the manufacturing equipment shown in FIG. 4, the anode active material layer was formed while the fixed base 21 was not moved but the position thereof was fixed to the raw material. Then, in Comparative example 1, the portion located in approximately central part of the fixed base 21 was cut and used for the anode. In Comparative example 2, the portion located on the end of the fixed base 21 was cut and used for the anode.

For the fabricated secondary batteries of Examples 1 to 3 and Comparative examples 1 and 2, charge and discharge test was conducted at 25 deg C., and the capacity retention ratio at the 31st cycle to the second cycle was obtained. Then, charge was performed until the battery voltage reached 4.2 V at a constant current density of 1 $mA/cm^2$, and then performed until the current density reached 0.05 $mA/cm^2$ at a constant voltage of 4.2 V. Discharge was performed until the battery voltage reached 2.5 V at a constant current density of 1 $mA/cm^2$. Charge was performed so that the utilization ratio of the capacity of the anode 33 was 90%, and metal lithium was not precipitated on the anode 33. The capacity retention ratio was calculated as a ratio of the discharge capacity at the 31st cycle to the discharge capacity at the second cycle, that is, as (the discharge capacity at the 31st cycle/the discharge capacity at the second cycle)×100.

Further, for the secondary batteries of Examples 1 to 3 and Comparative examples 1 and 2, the thickness before charge and discharge (at the zero cycle) and the thickness after repeating 31 cycles of charge and discharge were measured and the expansion width was obtained. Then, the expansion width ratio to Comparative example 1 was calculated according to Mathematical formula 1. The results are shown in Table 1.

Expansion width ratio=$[(A-B)/(a-b)]\times100$ (Mathematical formula 1)

In Mathematical formula 1, A represents the thickness of each Example before charge and discharge, B represents the thickness of each Example after 31 cycles of charge and discharge, a represents the thickness of Comparative example 1 before charge and discharge, and b represents the thickness of Comparative example 1 after 31 cycles of charge and discharge.

Further, for the secondary batteries of Examples 1 to 3 and Comparative examples 1 and 2, after the 31st cycle, the battery was disassembled and the anode 33 in the discharged state was taken out, washed with dimethyl carbonate, and the cross section in the thickness direction at the central portion of the anode 33 was observed by SEM. The cross section was cut by a microtome. FIG. 2 shown before is an SEM photograph of the anode active material layer 33 of Example 1. The SEM photograph of Example 2 was almost the same as of Example 1. The SEM photograph of Example 3 is shown in FIG. 9, the SEM photograph of Comparative example 1 is shown in FIG. 10, and the SEM photograph of Comparative example 2 is shown in FIG. 11, respectively.

As shown in FIGS. 2 and 9 to 11, in Examples 1 to 3 and Comparative examples 1 and 2, a state that the plurality of primary particles 123 aggregate and formed the secondary particles was confirmed. Further, in Examples 1 to 3, at least some of the primary particles 123 were curved to the anode current collector 33A. Meanwhile, in Comparative example 1, the primary particles were grown linearly and almost perpendicularly, and in Comparative example 2, the primary particles were grown linearly at a slant.

TABLE 1

Figure 9:
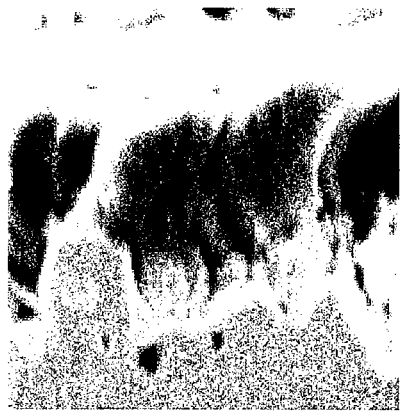
FIG. 9 is an SEM photograph showing a particle structure of an anode active material layer according to Example 3 of the present invention.
Figure 10:
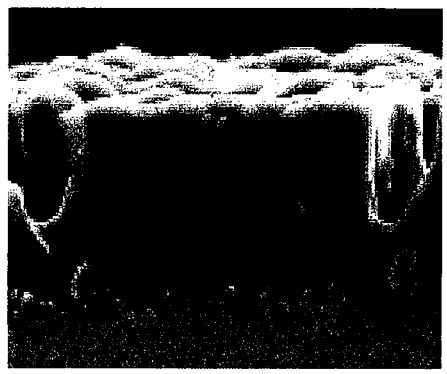
FIG. 10 is an SEM photograph showing a particle structure of an anode active material layer according to Comparative example 1 relative to the present invention.
Figure 11:
FIG. 11 is an SEM photograph showing a particle structure of an anode active material layer according to Comparative example 2 relative to the present invention.

| | Anode active material layer manufacturing equipment | Primary particle shape | | Expansion width ratio (%) | Capacity retention ratio (%) |
|---|---|---|---|---|---|
| Example 1 | FIG. 4 | Curved | FIG. 2 | 93 | 88.2 |
| Example 2 | FIG. 5 | | | 90 | 89.2 |
| Example 3 | FIG. 6 | | FIG. 9 | 88 | 92.2 |
| Comparative example 1 | Incident angle of raw material: constant | Perpendicular | FIG. 10 | 100 | 85.2 |
| Comparative example 2 | | Slant | FIG. 11 | 94 | 86.0 |

Further, as shown in Table 1, according to Examples 1 to 3, the expansion width ratio could be small and the capacity retention ratio could be improved compared to Comparative examples 1 and 2. That is, it was found that when at least some of the primary particle 123 had a curved shape to the anode current collector 33A, direction of expansion and shrinkage due to charge and discharge could be dispersed, battery characteristics such as cycle characteristics could be improved, and the expansion ratio of the device could be small.

In particular, Example 3 could provide the most superior characteristics among the examples. It is thinkable that in Example 3, the primary particle was more curved and stress could be more dispersed compared to Examples 1 and 2. That is, it was found that the anode active material layer 33B was more preferably formed by changing the incident angle of the raw material while the anode current collector 33A was moved curvedly.

While the present invention has been described with reference to the embodiments and the examples, the present invention is not limited to the foregoing embodiments and the foregoing examples, and various modifications may be made. For example, in the foregoing embodiments and the foregoing examples, descriptions have been given of the case using the electrolytic solution as a liquid electrolyte or the so-called gelatinous electrolyte. However, other electrolyte, a solid electrolyte having ion conductivity, a mixture of a solid electrolyte and an electrolytic solution, or a mixture of a solid electrolyte and a gelatinous electrolyte, may be used.

For the solid electrolyte, for example, a high molecular weight solid electrolyte in which an electrolyte salt is dispersed in a high molecular weight compound having ion conductivity, or an inorganic solid electrolyte composed of ion conductive glass, ionic crystal or the like can be used. As a high molecular weight compound of the high molecular weight solid electrolyte, for example, an ether high molecular weight compound such as polyethylene oxide and a cross-linked body containing polyethylene oxide, an ester high molecular weight compound such as poly methacrylate, or an acrylate high molecular weight compound can be used singly, by mixing, or by copolymerization. As an inorganic solid electrolyte, a substance containing lithium nitride, lithium phosphate or the like can be used.

Further, in the foregoing embodiments and the foregoing examples, descriptions have been given of the coin-type secondary battery and the spirally wound laminated type secondary battery. However, the present invention can be similarly applied to a secondary battery having other shape such as a cylinder type secondary battery, a square type secondary battery, a button type secondary battery, a thin secondary battery, a large secondary battery, and a laminated type secondary battery.

It should be understood by those skilled in the art that various modifications, combinations, sub-combinations and alternations may occur depending on design requirements and other factors insofar as they are within the scope of the appended claims or the equivalents thereof.

What is claimed is:

1. A secondary battery comprising:
   a cathode;
   an anode; and
   an electrolyte,
   wherein,
   the anode comprises an anode current collector and an anode active material layer containing silicon (Si) as an element on the anode current collector,
   the anode active material layer has a plurality of primary particles grown in one layer on the anode current collector and in contact with the anode current collector,
   at least some of the plurality of primary particles are adjacent and joined to each other along a direction parallel to a surface of the anode current collector and aggregate to form a secondary particle,
   said anode active material layer has a plurality of distinct secondary particles,
   respective grooves are formed between adjacent secondary particles separating the adjacent secondary particles from each other, each groove being wider at an opening of the groove than at a bottom of the groove, the bottom of the groove comprising a surface of the anode active material layer,
   each secondary particle comprises more than two primary particles that are joined and curved in an identical direction with respect to each other when viewed in cross section of the secondary battery along a thickness direction of the anode current collector,
   the anode has a region including at least one groove and at least one set of adjacent secondary particles, and
   the anode active material layer is in contact with an entire surface of the anode current collector throughout the entire region.

2. The secondary battery according to claim 1, wherein the primary particles having the curved shape are structured such that the primary particles are effective to inhibit a shape destruction of the anode active material layer and a peeling of the anode active layer from the anode current collector.

3. The secondary battery according to claim 1, wherein the anode current collector comprises a metal material alloyed with silicon.

4. The secondary battery according to claim 1, wherein the anode current collector comprises a plurality of layers, the plurality of layers including a first layer that contacts the anode active material layer, the first layer comprising a metal material alloyed with silicon.

5. The secondary battery according to claim 1, wherein the bottom of the groove is closer to a side of the anode active material layer that is adjacent to the anode current collector than to a side of the anode active material that is opposite to the anode current collector.

* * * * *